United States Patent Office 3,330,678
Patented July 11, 1967

3,330,678
MANGANESE AND ALUMINUM CONTAINING PINK PIGMENTS FOR GLAZES AND UNDERGLAZES
Eugen Meyer-Simon and Herbert Mann, Frankfurt am Main, and Albert Rücker, Jugesheim, Kreis, Offenbach, Germany, assignors to Deutsche Gold- und Silber-Scheideanstalt vormals Roessler, Frankfurt am Main, Germany
No Drawing. Filed Mar. 18, 1965, Ser. No. 440,922
8 Claims. (Cl. 106—288)

The present invention relates to the production of manganese and aluminum containing pink pigments which are especially adapted as pigments for glazes and as underglaze pigments and to glazes colored therewith and ceramic objects carrying translucent glazes colored with such pigments as an underglaze pigment.

Copending application S.N. 304,650, filed Aug. 26, 1963, now abandoned, discloses the production of manganese and aluminum containing pink pigments which are suited for coloring ceramic masses by adding the usual amounts of aluminum compounds to manganese salts, namely, about 5 to 25 mols calculated as $Al_2O_3$ per mol of manganese salt calculated as MnO, as well as alkali metal and/or alkaline earth metal salts which melt below the firing temperature or from compounds which melt during firing and firing such mixture in an oxidizing atmosphere at temperatures between 800 and 1350° C., preferably, between 900–1100° C. The starting aluminum compounds used in the preparation of such pigments are compounds which are reactive during the firing, that is, $Al(OH)_3$, $AlO(OH)$ or $\gamma$-$Al_2O_3$ ($\alpha$-$Al_2O_3$ is not reactive). The products are indicated as suited for the coloring of ceramic masses, that is, mixtures of clay or kaolin with leaning material, fluxes and other raw materials for ceramic masses. With a ratio of 1 mol of MnO per 25 mol of $Al_2O_3$, that is, at the upper limit of the range for $Al_2O_3$ given above, only 0.04 mol of MnO is provided per mol of $Al_2O_3$. The color intensity obtained in the ceramic masses decreases with decrease in the MnO content in the pigment and pigments produced with more than 25 mol of $Al_2O_3$ per mol of MnO have been found technically uninteresting for coloring ceramic masses.

The use of the pigments produced according to application S.N. 304,650 as pigments for glazes or as underglaze pigments was found not to be possible in all instances as when the Mn ion was not completely built into the $Al_2O_3$ lattice, the glaze foams up during firing and the pigment is partially decomposed. It is to be noted that pigments when used in ceramic masses are in an acid medium whereas when they are used in glazes and as underglaze pigments they are in an alkaline medium which favors foaming.

According to the invention it was unexpectedly found that pink pigments of good color intensity which are excellently suited as pigments for glazes, as well as underglaze pigments if such pigments are produced using more than 25 mol and, preferably, 30 to 200 mol of reactive aluminum compound calculated as $Al_2O_3$ per mol of manganese salt calculated as MnO and more than 1.5 mol and, preferably, 1.7 to 20 mol of mineralizer calculated as the total alkali and alkaline earth oxides. The firing temperature employed can be between 700 and 1350° C. and, preferably, is between 750 and 1100° C. It was found that the alkali metal and alkaline earth metal salts used as mineralizers can be partially or completely replaced by lead salts. The chemical similarity of divalent lead ions and alkaline earth metal ions is known.

The table which follows contains 14 examples of pigments produced according to the invention and indicates the color intensity obtained therewith when used in a quantity of 10% by weight in a glaze of the following Seger formula:

$K_2O = 0.148$
$Na_2O = 0.250$
$CaO = 0.219$
$PbO = 0.046$
$ZnO = 0.337$ $Al_2O_3 = 0.408$
$SiO_2 = 2.920$
$B_2O_3 = 0.447$

The firing temperature given is that of the firing under oxidizing conditions employed in the preparation of the pigments per se.

When tested as underglaze pigments in a known manner the same results were obtained with regard to color intensity.

Group A of the table concerns pigment compositions 1–4 using alkali metal and alkaline earth metal compounds, mostly the halides, as mineralizers.

In compositions 5–12 in group B of the table, lead compounds were used as mineralizer in addition to the alkali metal and alkaline earth metal compound. In composition 13, $PbF_2$ was used alone as the mineralizer.

Composition 14 used $\alpha$-$Al_2O_3$ as the aluminum component. The light color intensity attained could be traced back to the use of the inactive $\alpha$-$Al_2O_3$.

TABLE

| Components in Grams | Group A | | | |
|---|---|---|---|---|
| | 1 | 2 | 3 | 4 |
| $MnCO_3$ | | | | 19.79 |
| $MnCl_2 \cdot 4H_2O$ (Corr. 1/10 mol) | 11.49 | 11.49 | 11.49 | |
| $Al(OH)_3$ | 271.28 | 404.40 | 671.95 | 683.65 |
| Mol as $Al_2O_3$ per 1 mol MnO | 17.4 | 25.9 | 43.1 | 43.8 |
| NaF | 8.42 | 15.64 | 8.31 | 14.22 |
| NaCl | | 21.82 | | |
| $CaCl_2$ | 7.50 | | | |
| $CaCO_3$ | | | 7.43 | |
| Mol mineralizer as oxides per 1 mol MnO | | | | 10.25 |
| Firing temperature, °C | 1.7 | 3.7 | 1.7 | 2.7 |
| Color intensity in the glaze | 1,050 | 1,050 | 1,050 | 1,050 |
| | Strong | Strong | (¹) | Strong |

¹ Medium strong.

TABLE

| Components in Grams | Group B | | | | | | | | | |
|---|---|---|---|---|---|---|---|---|---|---|
| | 5 | 6 | 7 | 8 | 9 | 10 | 11 | 12 | 13 | 14 |
| $MnCO_3$ | 11.49 | 11.49 | 11.49 | 11.49 | 11.49 | 11.49 | | 11.49 | 11.49 | 11.49 |
| $MnO_2$ (Corr. 1/10 mol) | | | | | | | 8.69 | | | |
| $Al(OH)_3$ | | 335.22 | 404.40 | [1] 335.4 | 404.40 | 406.30 | 674.12 | 1,985.31 | 404.40 | |
| $\gamma$-$Al_2O_3$ | 267.30 | | | | | | | | | |
| $\alpha$-$Al_2O_3$ | | | | | | | | | | 442.05 |
| Mol as $Al_2O_3$ per 1 mol MnO | 17.1 | 21.5 | 25.9 | 25.9 | 25.9 | 26.0 | 43.2 | 127.3 | 25.9 | 43.3 |
| NaF | | 8.41 | 8.41 | 8.41 | 10.64 | 11.76 | 14.01 | 41.27 | | 13.97 |
| $CaF_2$ | 7.43 | | | | | | | | | |
| $PbCl_2$ | | 18.62 | 18.62 | 18.62 | 11.60 | 26.30 | 31.05 | | | 31.03 |
| $PbF_2$ | | | | | | | | | 26.71 | |
| $PbSiO_3$ | 19.88 | | | | | | | | | |
| Mol mineralizer as oxides per 1 mol MnO | 1.7 | 1.7 | 1.7 | 1.7 | 1.7 | 2.3 | 2.7 | 8.2 | 1.1 | 2.8 |
| Firing temperature °C | 1,150 | 1,050 | 1,050 | 1,050 | 1,050 | 750 | 1,050 | 1,050 | 1,050 | 1,250 |
| Color intensity in the glaze | [2] | Strong | Strong | Strong | Strong | Strong | [2] | [2] | Strong | [3] |

NOTES.—[1] AlO(OH) instead of $Al(OH)_3$.  [2] Medium strong.  [3] Very strong.

We claim:

1. In a method for the production of manganese and aluminum containing pink pigments adapted as pigments for glazes for ceramic masses and as underglaze pigments by firing mixtures of manganese salts and aluminum compounds under oxidizing conditions, the steps which comprise admixing with the manganese salt an aluminum compound which is active during the firing selected from the group consisting of $Al(OH)_3$, AlO(OH) and $\gamma$-$Al_2O_3$ and as a mineralizer at least one salt selected from the group consisting of alkali metal, alkaline earth metal and lead II salts which melt below the firing temperature and such salts which are converted to compounds which melt below the firing temperature during the firing, the quantity of reactive aluminum compound calculated as $Al_2O_3$ being more than 25 mol to 200 mol and the quantity of mineralizer salt calculated in mols of corresponding oxide being more than 1.5 mol to 20 mol per mol of manganese salt calculated as MnO and firing such mixture at a temperature between 700 and 1350° C.

2. The process of claim 1 in which the mixture is fired at a temperature between 750 and 1100° C.

3. A ceramic glaze colored with a pigment produced according to claim 1.

4. A ceramic object carrying a translucent glaze and colored with an underglaze pigment produced according to claim 1.

5. The method of claim 1 in which said mineralizer includes at least one of said lead salts.

6. The process of claim 5 in which the mixture is fired at a temperature between 750 and 1100° C.

7. A ceramic glaze colored with a pigment produced according to claim 5.

8. A ceramic object carrying a translucent glaze and colored with an underglaze pigment produced according to claim 5.

References Cited
UNITED STATES PATENTS 2,243,033  5/1941  Harbert _____ 106—288

TOBIAS E. LEVOW, *Primary Examiner.*

J. E. POER, *Assistant Examiner.*